May 28, 1968     B. SILVER     3,385,611

COUPLING UNIT FOR VEHICLES

Filed May 4, 1966

INVENTOR
Boris Silver

BY *Clive H. Bramson*

ATTORNEY

United States Patent Office 3,385,611
Patented May 28, 1968

3,385,611
COUPLING UNIT FOR VEHICLES
Boris Silver, 2340 New York Ave.,
Huntington Station, N.Y. 11746
Filed May 4, 1966, Ser. No. 547,604
2 Claims. (Cl. 280—511)

This invention relates to coupler or hitch devices for connecting trailer or draft vehicles to motor vehicles such as automobiles, trucks and the like.

The present invention is more particularly related to a coupling unit for vehicles which comprises a unique combination of a conventional ball type hitch and a post type hitch whereby both of the latter can be simultaneously utilized to the end of providing a double hitch coupling arrangement between the towing and draft vehicles.

Whereas simplicity and safety encompass the foremost desiderata of structures employed for coupling and hitching purposes, the new and useful coupling unit according to the instant invention, provides a device of such nature which may readily be connected to the towing vehicle without requiring the application of additional bulwark or bracing members to said vehicle in preparation for the attachment of the coupling unit thereto, an whereby the concurrent use of the ball and post hitches affords a measure of safety not heretofore achievable.

Accordingly, and in consonance with the foregoing, the instant invention has for an object the provision of a coupling unit for vehicles which may be attached directly to the bumper or body of the towing vehicle.

Another object of the present invention is to provide a device of the foregoing character which will afford a dual type of coupling arrangement although only a single coupling unit is utilized.

A further object of this invention resides in the provision of a device wherein the ball-hitch member also functions to facilitate manipulation of a closure member to secure the draft vehicle to the post-hitch member.

Another object of the present invention is to provide a device in accordance with the foregoing wherein the ball and post-hitch members may be conveniently oriented in vertical and also coaxial relation.

Another general object of the present invention is to provide a device of the described character which will be simple in structure, economical of manufacture, easily and quickly installed and highly effective in use.

Other objects and advantages of the instant coupling unit will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

Figure 1:
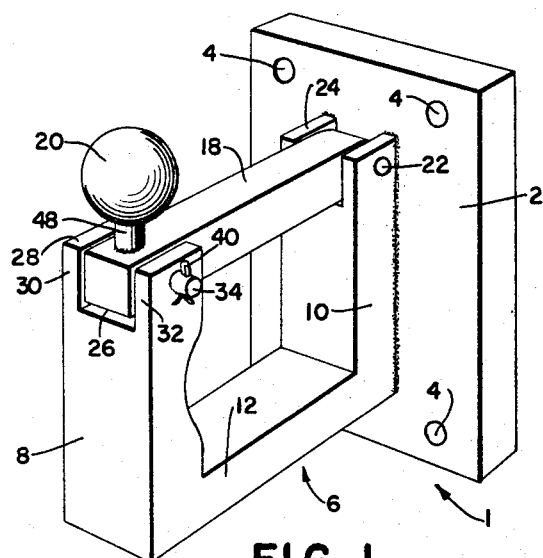
FIGURE 1 is a perspective view of the coupling unit.
Figure 2:
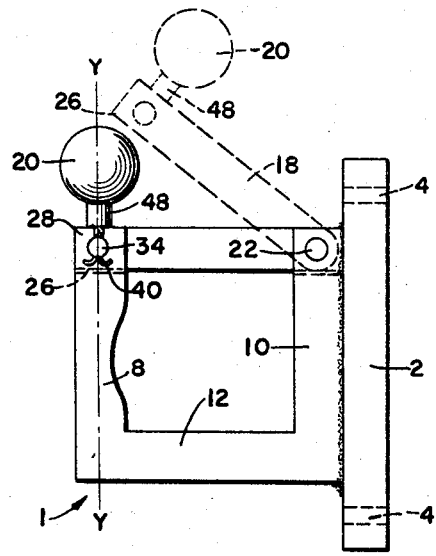
FIGURE 2 is a side elevational view of the coupling unit showing the pivotal character of the closure member.
Figure 3:
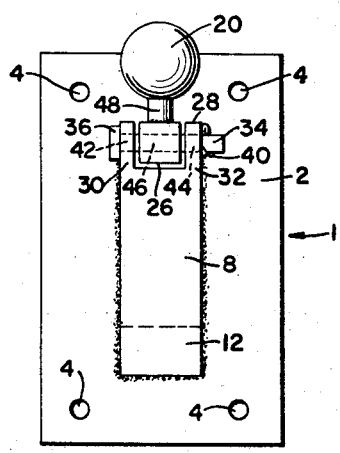
FIGURE 3 is a front elevational view thereof.
Figure 4:
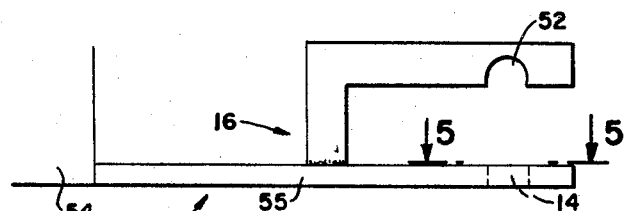
FIGURE 4 is an elevational view of a coupler attached to a draft vehicle, said coupler being adapted for connection to the coupling unit.
Figure 5:
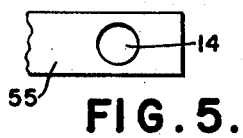
FIGURE 5 is a view taken along line 5—5 of FIGURE 4.

Referring now in detail to the present preferred embodiment of the invention illustrated in the accompanying drawings, FIGURES 1–3 show the coupling unit designated generally by numeral 1 in the various positions as heretofore described.

More specifically, the coupling unit will be seen to comprise base part 2 which is essentially a flat plate having bolt-receiving openings 4 therethrough, and projection means 6 comprised of a U-shaped section as shown connected to said base part 2 and a closure member to be described. Said U-shaped section will be further observed to include upright arm portions 8 and 10 and a base portion 12 extending therebetween.

Figure 7:
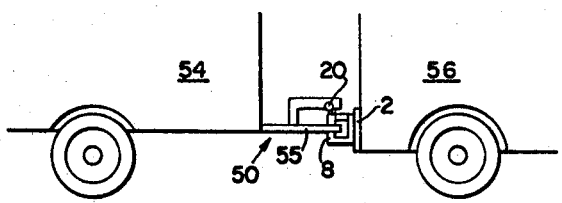
FIGURE 7 shows the draft and towing vehicles connected by the coupling unit and the coupler.
Figure 6:
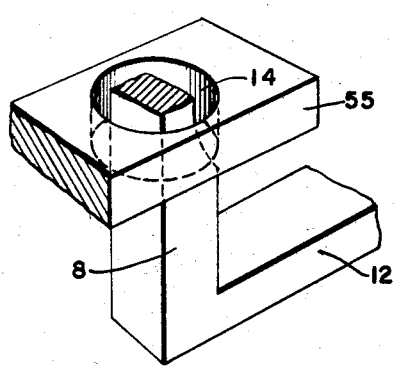
FIGURE 6 is an enlarged fragmentary perspective view illustrating the connection of the post-hitch member and the ring member of the coupler attached to the draft vehicle.

Upright arm portion 10 is attached to said plate 2, such attachment being by welding as shown or any other suitable means. Upright arm portion 8 which is arranged spacedly and in parallelism with respect to base part 2 comprises the post-hitch member about which passage 14 or ring of coupler 16 is secured when the towing and draft vehicles are coupled as illustrated in FIGURES 6 and 7.

Closure member 18, to which ball-post hitch member 20 is, at one end, pivotally mounted at pin 22 to upper end 24 of said upright arm portion 10, the free end 26 of said closure member being adapted to swing between substantially contiguous and spaced positions with respect to upper end 28 of said post-hitch member as shown in solid and broken line designations, respectively, in FIGURE 2 of the drawings.

In the preferred embodiment shown in the drawings, the upper end of the post-hitch member is bifurcated whereby said closure member is securable between ears 30 and 32 by pintle 34 which has a head 36 at one end and an aperture at the other end, cotter pin 40 being receivable through said aperture. As shown, pintle 34 also passes through apertures 42 and 44 which are provided in said ears 30 and 32, and through aperture 46 located in said closure member to thereby enable securement of said closure member to said post-hitch member when apertures 42, 44 and 46 are in alignment.

Ball-hitch member 20 is preferably as shown attached to a stud 48 which is attached to end 26 of said closure member. Such attachment is accomplished by welding, threading or the like or the parts may suitably be formed integrally as e.g., by casting or forging.

Accordingly, when said ball and post-hitch members are secured as shown in FIGURE 2, the vertical axis Y—Y common to both members is in alignment and projection means 6 comprises a rectangular loop configuration as observed in FIGURE 2.

Coupler 50 which comprises a horizontally disposed ring passage 14 and a conventional ball socket 52, is connected to the draft vehicle 54 by bar 55, and coupling unit 1 is connected to the towing vehicle 56 as shown in FIGURE 7 of the drawings. As shown, said ball-socket is provided within support structure attached to said horizontal bar and is spacedly superposed with respect to said ring passage.

In operation, ring passage 14 is slipped over post-hitch member 8 when closure member 18 is swung upwardly as shown in FIGURE 2. Once the ring is positioned about member 8, the closure member is swung downwardly to be secured to member 8 and said ball socket 52 is secured to the ball-hitch member 20 in a conventional manner. Thus a double connection is effectuated and lateral motion between said draft and tow vehicles is permitted, the foregoing double measure of safety being afforded in the novel and convenient manner described.

Although the preferred embodiment of the coupling unit for vehicles has been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. A coupling unit for vehicles comprising in combination a first member adapted for attachment to a first vehicle and a second member adapted for attachment to a second vehicle, said first member comprising a base part lying in a vertical plane, projection means connected to and having a portion extending generally horizontally from said base part, a post-hitch member connected to and extending generally vertically of said projection means, said post-hitch member having a free end including securement means thereat, said post-hitch member being spaced with respect to said base part, a closure member pivotally connected at one end to said projection means, the other end of said closure member including securement means thereat, said latter securement means being adapted for removable securement with respect to said securement means of said post-hitch member, said other end of said closure member being adapted to swing between a closed position contiguous with and secured to the free end of said post-hitch member and an opened position spaced from said latter free end whereby when in closed position said projection means and closure member define a closed loop, a ball-hitch member mounted upright upon and proximately of the other end of said closure member, said ball-hitch member lying outside of said loop, said second member comprising an horizontal bar having a horizontally disposed ring passage therethrough, a ball-socket support structure attached to said horizontal bar and a ball-socket provided therein, said ball-socket being spaced superposed with respect to said ring passage, said ball-hitch member being receivable within said ball-socket and said post-hitch member being receivable within said ring passage thereby providing a double connection between said first and second vehicles when said first and second members are attached to said respective vehicles and said ball-hitch and post-hitch members are concurrently received within said ball-socket and ring passage, respectively.

2. A coupling unit as set forth in claim 1 wherein the vertical axes of said ball and post-hitch members are in alignment when said post-hitch and closure members are mutually secured.

References Cited

UNITED STATES PATENTS

| | | | |
|---|---|---|---|
| 1,119,667 | 12/1914 | Voller | 280—504 |
| 1,411,230 | 3/1922 | Weber | 280—504 |
| 2,370,699 | 3/1945 | Martinelli et al. | 280—506 |

FOREIGN PATENTS

| | | |
|---|---|---|
| 928,259 | 12/1947 | France. |
| 973,055 | 2/1951 | France. |

LEO FRIAGLIA, *Primary Examiner.*

BENJAMIN HERSH, *Examiner.*

C. C. PARSONS, *Assistant Examiner.*